March 31, 1970   J. A. ROGUS   3,503,521
COLUMNAR SUSPENDIBLE AND NESTABLE RECEPTACLES
Filed March 7, 1968   5 Sheets-Sheet 1
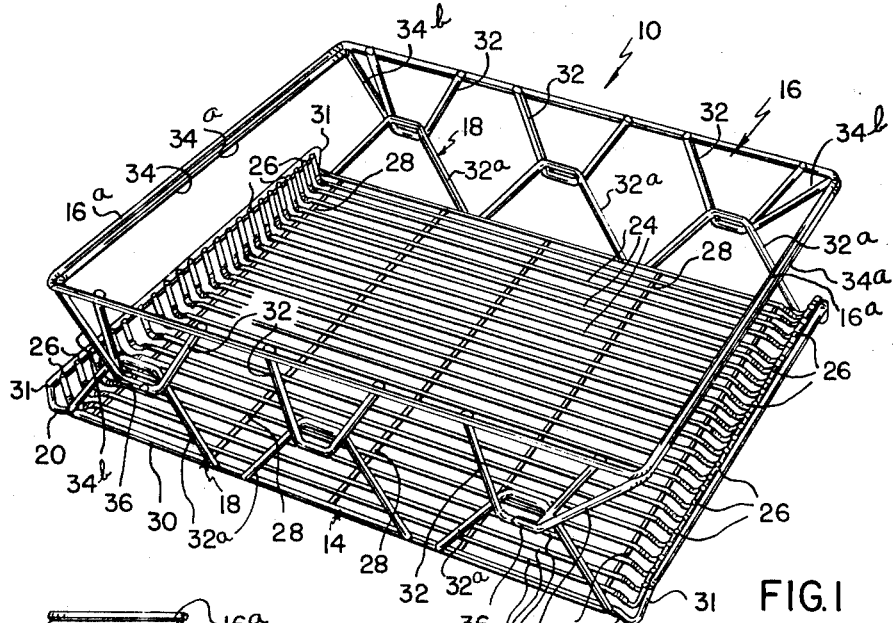
FIG.1
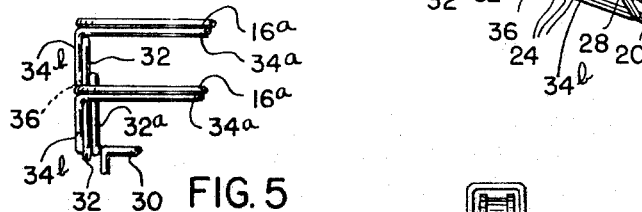
FIG. 5
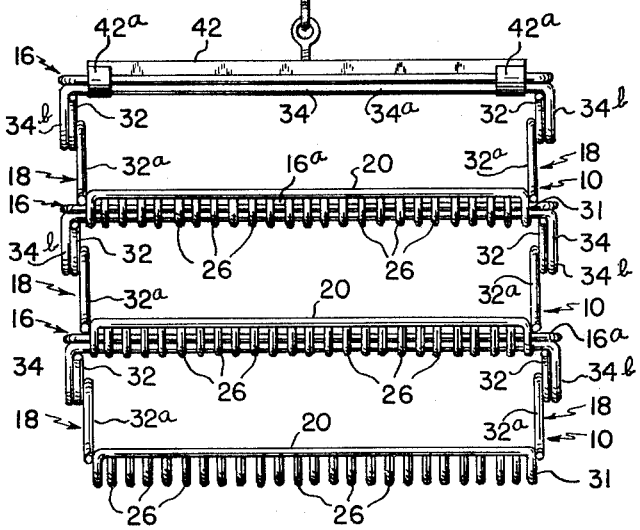
FIG.2
INVENTOR.
JOSEPH A. ROGUS
BY
Baldwin, Egan, Walling & Fetzer
ATTORNEYS March 31, 1970          J. A. ROGUS          3,503,521

COLUMNAR SUSPENDIBLE AND NESTABLE RECEPTACLES

Filed March 7, 1968          5 Sheets-Sheet 2

INVENTOR.
JOSEPH A. ROGUS
BY
Baldwin, Egan, Walling Fetzer
ATTORNEYS

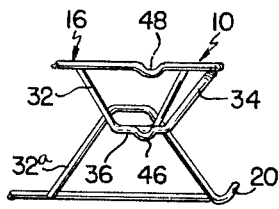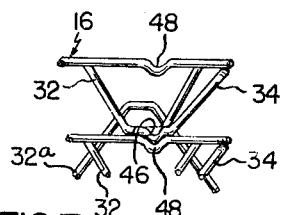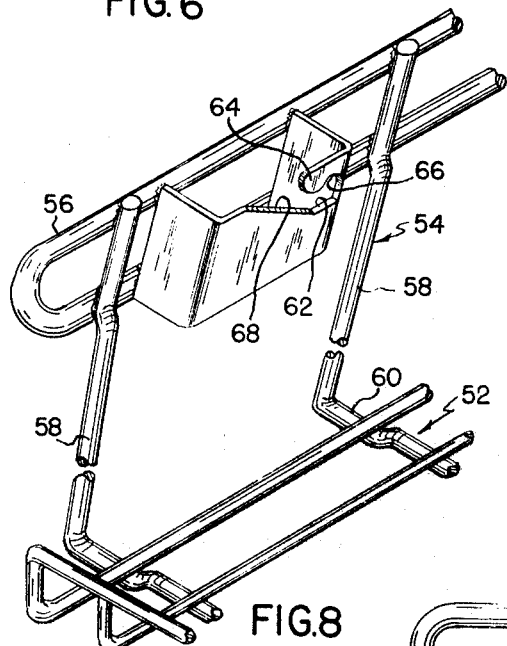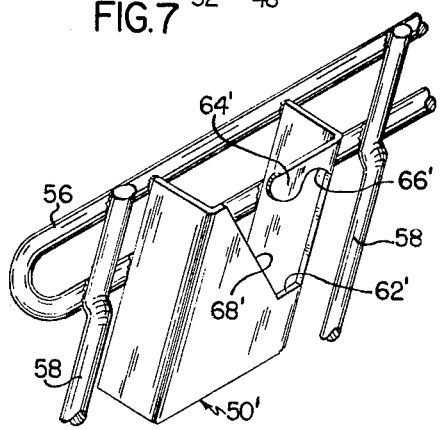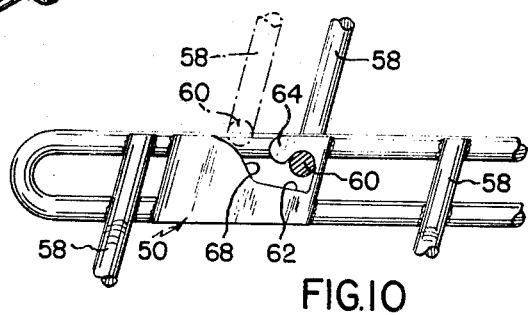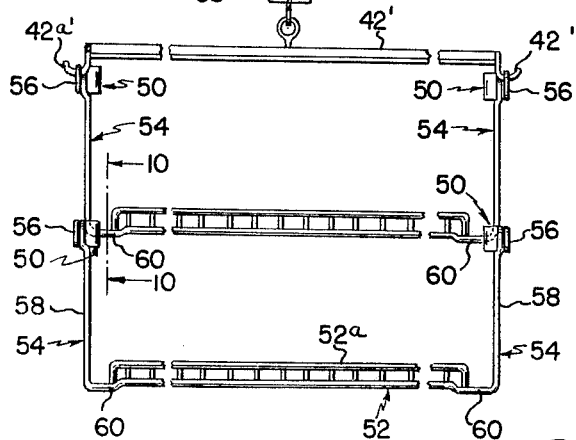

March 31, 1970  J. A. ROGUS  3,503,521
COLUMNAR SUSPENDIBLE AND NESTABLE RECEPTACLES
Filed March 7, 1968  5 Sheets-Sheet 4
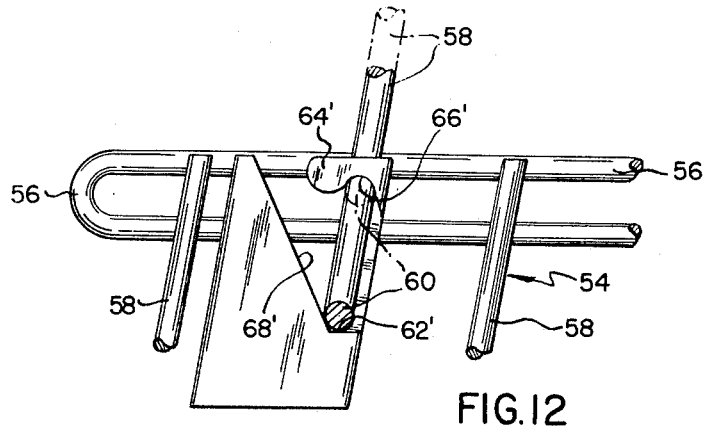
FIG.12
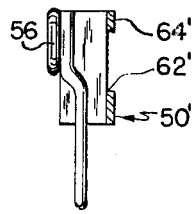
FIG.13
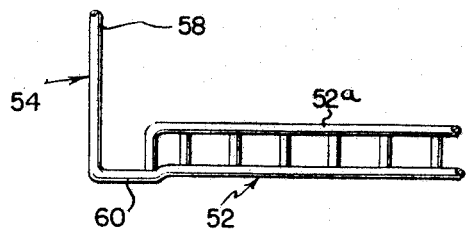
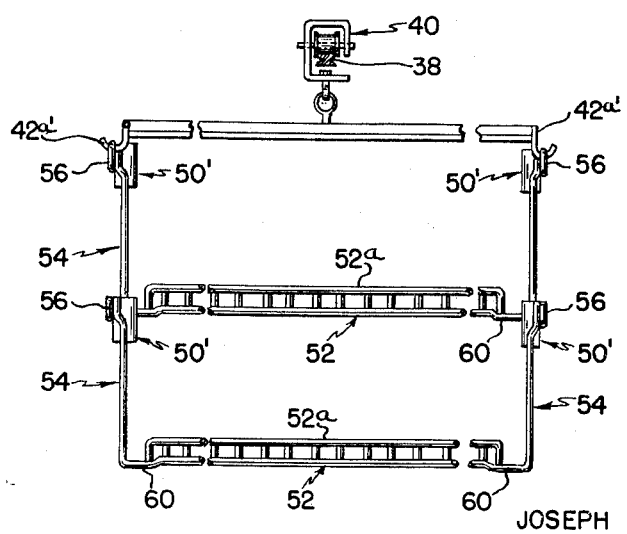
FIG.14
INVENTOR.
JOSEPH A. ROGUS
BY
Baldwin, Egan, Walling & Fetzer
ATTORNEYS March 31, 1970  J. A. ROGUS  3,503,521
COLUMNAR SUSPENDIBLE AND NESTABLE RECEPTACLES
Filed March 7, 1968  5 Sheets-Sheet 5

INVENTOR.
JOSEPH A. ROGUS
BY
ATTORNEYS

United States Patent Office 3,503,521
Patented Mar. 31, 1970

3,503,521
COLUMNAR SUSPENDIBLE AND NESTABLE RECEPTACLES
Joseph A. Rogus, Willowick, Ohio, assignor to Mid-West Metallic Products, Inc., Cleveland, Ohio, a corporation of Ohio
Filed Mar. 7, 1968, Ser. No. 711,420
Int. Cl. A47f 3/14; A47j 41/00
U.S. Cl. 211—126                          3 Claims

ABSTRACT OF THE DISCLOSURE

A receptacle or tray adapted for being suspended with other like receptacles into a columnlike or chainlike arrangement when in use, with the columnlike or chainlike arrangement being collapsible into nested condition when the receptacles are not being used, for conserving space. In one embodiment, each receptacle comprises a looplike upper edge portion and a bottom portion with side wall portions rigidly connecting the upper edge and bottom portions. The bottom portion is provided with hooklike means on opposite ends thereof adapted for supporting or receiving the upper edge portion of the next lower receptacle for suspending the receptacles in said chainlike or columnlike condition. The side wall portions have abutment means thereon adapted for engaging the upper edge portion of the next lower receptacle when the receptacles are nested, for limiting the telescoping of the receptacles and stabilizing the nested receptacles. In other embodiments, tiering support portions on the receptacles are adapted for holding coaction with one another upon lifting up or suspending an upper receptacle with respect to a lower receptacle, for orienting a series of stacked receptacles into a chainlike arrangement.

---

This invention relates in general to improvements in receptacles, and more particularly to a novel arrangement of nestable-type receptacles which can be suspended in columnarlike form.

It is known in the prior art to provide nestable and stackable-type containers. Examples of such prior art stackable and nestable receptacles are illustrated, for instance, in U.S. Patents 3,091,355, 3,100,582 and 3,202,294 issued on May 28, 1963, Aug. 13, 1963 and Aug. 24, 1965, to T. R. Mutto, W. H. Lockwood and J. A. Rogus respectively.

The present invention relates to a receptacle or tray which is adapted to be nested when empty with like receptacles and which, when in use, is adapted to be oriented with like receptacles in suspended columnarlike or chainlike form.

Accordingly, an object of the invention is to provide an improved arrangement of receptacle which is adapted in use to be suspended with other like receptacles into columnarlike or chainlike form, and which may be readily collapsed into a nested-like arrangement when desired, for conserving space.

Another object of the invention is to provide a columnar-suspendible and nestable receptacle having no moving parts and having rigidly connected portions thereon which are adapted for providing for suspending a plurality of the receptacles in columnar form when in use, and which are movable with respect to one another into nesting position from the suspended columnar position.

A still further object of the invention is to provide a columnar suspendible and nestable receptacle comprising a gridlike bottom portion and a looplike upper edge portion with side wall portions rigidly connecting the bottom and upper edge portions, and wherein the bottom portion has hooklike means at the ends thereof extending beyond the projection of the corresponding ends of the overlying upper edge portion and adapted to engage and support the ends of the upper edge portion of the next adjacent receptacle to maintain the receptacles in columnar suspended condition.

A still further object of the invention is to provide nestable and stackable receptacles which include tiering support portions on the side walls thereof adapted for engaged coaction for supporting a series of the receptacles in stacked condition, and wherein such support portions include means thereon adapted for holding coaction with one another upon lifting up on an upper receptacle, for providing a suspendible chainlike arrangement of the receptacles.

Other objects and advantages of the invention will be apparent from the following description taken in conjunction with the accompanying drawings wherein:

FIGURE 1 is a perspective view of a tray or receptacle formed in accordance with the invention;

FIGURE 2 is an end elevational view showing a plurality of the trays or receptacles disposed in columnar suspended condition, with the column orienting support means on each of the trays coacting with one another to maintain the columnar relationship of the trays;

FIGURE 5 is a fragmentary end elevational view of the trays when in the nested condition of FIGURE 4;

FIGURE 6 is a fragmentary side elevational view of a slightly modified tray which embodies projection and recess means thereon for resisting longitudinal movement of one tray with respect to the adjacent tray in the nested condition of the trays;

FIGURE 7 is a fragmentary view similar to FIGURE 6, but illustrating the coaction between the projection and recess means of a pair of nested trays;

FIGURE 8 is a fragmentary perspective view of another embodiment of tray which includes tiering seat brackets on the side walls thereof for supportig a series of the trays in stacked condition, and wherein the tiering brackets include means adapted for holding coaction with an adjacent stacked tray for holding the trays in chainlike form upon suspension of the trays;

FIGURE 9 is a partially broken, end elevational view of a plurality of trays of the type of FIGURE 8, disposed in columnar suspended condition, with the tiering brackets on the lower tray coacting with the bottom cross wires of the upper tray in the chainlike arrangement produced by the suspended condition;

FIGURE 10 is an enlarged fragmental, elevational view taken generally along the plane of the line 10—10 of FIGURE 9; in phantom lines is illustrated the entry position of the upper tray cross wire into the tiering bracket of the lower tray;

FIGURE 11 is a fragmentary perspective view of another embodiment of tray somewhat similar to that of FIGURE 8, but illustrating a tiering bracket of greater depth, providing substantially greater clearance between the coacting bottom cross wire of the upper tray and the overhanging ear on the tiering bracket of the lower tray;

FIGURE 12 is an enlarged elevational view illustrating in full lines the coaction between the bottom cross wire of the upper tray and the tiering bracket of the lower tray in the stacked condition of the trays; in phantom lines is illustrated the engagement of the bottom cross wire and the overlying ear on the tiering bracket in the suspended condition of the trays into chainlike form;

FIGURE 13 is a reduced size, fragmentary sectional view taken through the tiering bracket of the tray of FIGURES 11 and 12;

FIGURE 14 is a partially broken, end elevational view of a plurality of trays of the type of FIGURES 11 and 12, disposed in columnar suspended conditions, with the tiering brackets on the lower tray coacting with the bottom cross wires of the upper tray, in the chainlike arrangement;

Figure 3:
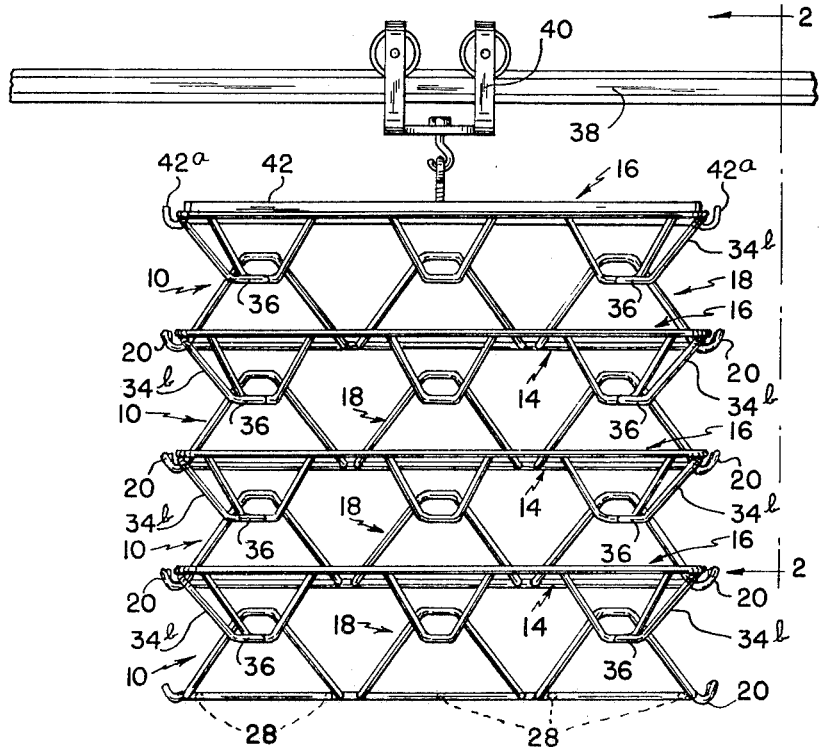
FIGURE 3 is a side-elevational view of the columnar assembly illustrated in FIGURE 2.

Referring now again to the drawings, and particularly to FIGURE 1, each of the receptacles or trays 10 may comprise a generally rigid framework including a plurality of rigidly interconnected portions. Each receptacle may comprise a bottom portion 14 for supporting articles thereon, upper loop-like edge portion 16 spaced above the bottom portion 14, and two generally parallel sidewall portions 18 rigidly connecting the bottom portion 14 and upper edge portion 16. Bottom portion 14 adjacent opposite ends thereof includes bottom suspending support means 20 which are adapted to coact in supporting relation with the upper edge end portions 16a of the next adjacent receptacle or tray, when the trays are disposed in columnar-suspended relation as illustrated for instance in FIGURE 2.

Bottom portion 14 may be of any suitable construction, but as illustrated, comprises a grid-like arrangement formed of a plurality of interconnected rod-like parts including parallel lengthwise rods 24, which at their ends are provided with hook-shaped portions 26 forming the columnar suspending supporting means 20, with the rods 24 being connected by transversely extending rods 28, which at their ends are connected to the closed looplike peripheral member 30 of the bottom portion 14. As can be seen, the peripheral loop 30 is bent upwardly at its ends, as at 31—FIGURES 1 and 4, and is rigidly attached as by welds to the hook portions 26 of the lengthwise rods 24, for forming a rigid construction for columnar suspending portions 20.

As can be best seen in FIGURE 3, portions 20 of each tray extend outwardly beyond a vertical plane defining the the outer extremity of the overlying end sections 16a of upper loop 16 of the tray.

Each sidewall portion 18 of the tray comprises, in the embodiment illustrated, a plurality of generally U-shaped parts 32, 32a, with each of such sidewall parts formed from a bent rod and arranged in pairs which are welded or otherwise secured together. The upper distal ends of parts 32 are secured by as by welds to the corresponding inner surfaces of the upper edge portion 16, and the lower distal ends of the lower parts 32a are likewise secured to the corresponding exterior side edge of the peripheral loop 30 of bottom portions 14. This sidewall arrangement 18 permits like trays or receptacles to be moved into nesting position as shown, for example, in FIGURE 4, with the lower parts 32a of sidewall portions 18 being adapted to clear the upper edge loop portion 16 of the underlying tray for stacking the nested arrangement of receptacles. As can be seen from FIGURE 2, sidewall portions 18 in end elevation provide a generally stepped configuration, with upper parts 32 being positioned outwardly of the lower parts 32a.

As can be best seen from FIGURE 1, the end portions 16a of upper loop 16 may be reinforced by means of the generally U-shaped reinforcing parts 34. Each reinforcing part may be formed of a single bar or strip of material and comprises an elongated transversely extending portion 34a and leg portions 34b extending diagonally downwardly from the transversely extending portion 34a, with the distal ends of each leg portion being bent as at 36, to extend generally horizontally into engaged side coaction with the respective upper U-shaped part 32 of associated sidewall portion 18. Such horizontally extending end portions 36 can be secured as by means of welds to the connecting section of the respective U-shaped part 32, and the elongated transverse section 34a of the reinforcing member 34 can likewise be secured as by welds to the end section 16a of the top loop 16, thereby providing an extremely high strength rigid receptacle or tray in the vicinity of the top loop end sections. Such reinforced end sections 16a of the top loop provide for the suspending of the tray from the next adjacent upper tray or receptacle, when the receptacles or trays are disposed in columnar suspended relation, for supporting articles on the bottom portion of each receptacle as seen in FIGURES 2 and 3. As can be seen from the latter figures, a typical suspension of the columnar orientated plurality of trays might be an upper tram rail 38 supporting a wheeled dolly 40, which in turn supports a rack 42 having clips or hook-shaped supports 42a on its ends which coact with the end sections 16a of the immediately adjacent tray, for supporting such tray on the rack.

After the suspended trays have been used and it is desired to nest the trays or receptacles and thus save storage space for such trays, the columnar arrangement of trays can be telescopically collapsed wherein each of the tray portions below the upper U-shaped parts 32 of each sidewall is received in the next lower receptacle, thus nesting the trays together. The aforementioned upper parts 32 of the sidewalls 18 are prevented from moving past the top loop 16 of the next lower tray by engagement of portions 36 on reinforcing parts 34 with underlying top loop 16, to positively limit the inward telescoping movement of the nested trays with respect to one another, and prevent any inadvertent wedging coaction between the nested trays. Relative lateral movement between the nested trays is limited by engagement of lower parts 32a of sidewall portions 18 with confronting upper parts 32 of the sidewalls of the lower tray.

The trays may be assembled with respect to one another so that they can be disposed in columnar suspended relation when in use, by tilting an upper tray endwise, and then moving its columnar-suspenduing portion 20 under the adjacent end portion 16a of the top loop 16 in the next lower tray and until the columnar suspending portion 20 on the other end of the upper tray clears the tranverse end portion 16a on the other end of the lower tray, and then pivoting the upper tray downwardly and then shifting it horizontally so that the columnar-suspending end portions 20 on the upper tray underly the end portions 16a of the upper loop on the lower tray. The upper tray may then be moved vertically downwardly to nest until the portions 36 on the sidewalls of the upper tray rest on the underlying upper loop of the lower tray, and so on until the desired number of trays are disposed in nested and intercoacting relation. When the trays are suspended on the rack 42 for movement with the dolly 40 on the tram rail, the trays will separate due to gravitational forces until bight portions of the suspending means 20 on each tray engages the vertically aligned transversely extending end portions 16a of the upper loop of the next lower tray, thus orienting the trays in columnar, registering relation.

Figure 4:
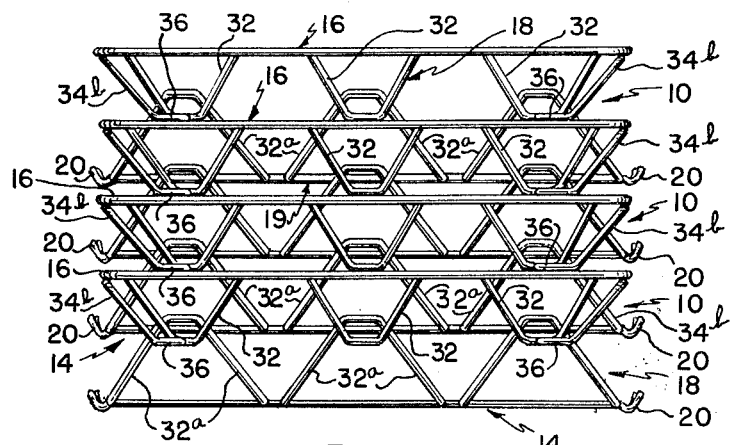
FIGURE 4 is a side-elevational view of the tray assembly illustrated in FIGURE 3 but showing the trays nesting when the latter are in a collapsed condition.

Referring now to FIGURES 6 and 7 there is illustrated an arrangement of projection and recess means on the ends of a tray of the general type illustrated in FIGURE 1, for preventing longitudinal movement of one tray with respect to an underlying tray when the trays are disposed in the nested condition, as illustrated for instance in FIGURE 4 of the drawings. The horizontal portions 36 of reinforcing members 34 are each formed with a downwardly projecting protuberance 46 thereon which protuberance is adapted to be received in a complementary recess 48 formed in the upper edge portion 16 of each tray in overlying relationship with respect to the protuberance 46 in the respective tray. As can be seen in FIGURE 7, when the protuberance 46 on an upper tray is received in the recess 48 in the next lower tray, the trays will be prevented from moving longitudinally with respect to one another, thus interlocking trays together. It will be understood that the protuberances and recesses are preferably provided at both ends of each tray and on both sides thereof. In other respects this embodiment of tray is generally similar to the first described embodiment.

Referring now to FIGURES 8, 9 and 10, there is illustrated a stackable and nestable type tray which includes tiering portions or tiering brackets 50 thereon. This tray is the type illustrated and described in U.S. Patent 3,202,294 entitled "Shift Type Nesting and Stacking Receptacle" and issued Aug. 24, 1965, to Joseph A Rogus. The tray in general comprises a bottom portion 52 and side portions 54 extending upwardly from the bottom portion. The bottom portion may have raised ends 52a extending upwardly therefrom to prevent articles from falling out of the tray. As disclosed in Patent 3,202,294, each side portion 54 includes an upper sidewall member 56 of elongated generally loop-like configuration and to which is attached the aforementioned tiering seat brackets 50, with such brackets being located adjacent opposite ends of the sidewall member 56 on both sidewall portions 54 of each tray. Sidewall wire sections 58 extend downwardly from the respective side member 56 and then are bent at aproximately right angles to form the transversely extending bottom wall wire sections 60.

As disclosed in the aforementioned patent, in the nested condition of the trays or receptacles, the sidewall members 56 of an upper receptacle engage the underlying sidewall members of the lower receptacle, thereby spacing the bottom portions 52 of the receptacles from one another and preventing wedging action between the sidewall portions of the nested trays or receptacles. In the tiered or stacked condition of the receptacles, a bottom wire section 60 is adapted to be received in the slotted seat 62 in each bracket 50 and support the stacked receptacles on one another, thus maintaining the receptacles in stacked condition with the bottom wall portions 52 being materially separated from one another.

In accordance with the present invention, each tiering seat bracket 50 is provided with an ear portion 64 above the tiering seat 62, and which ear has an undercut suspension seat 66 disposed in generally confronting relation to the tiering seat 62 and formed generally complementary to the exterior configuration of the opposed wire section 60. Thus, when a plurality of stacked trays of this type are lifted upwardly into suspended condition, the bottom cross wire section 60 in each bracket 50 engages the seat 66 and supports an underlying tray with respect to the tray immediately thereabove, thus maintaining the suspended trays in columnar or chainlike condition. As can be seen in FIGURE 9, such suspended condition can be provided by the wheeled dolly 40 running on an overhead rail 38. Dolly 40 may support a rack 42 which has hook portions 42a' thereon for hooking into side members 56. Some of the hook portions 42a' may be pivoted to the rack 42' for convenience in hooking onto the upper side members 56. As can be seen in FIGURE 10 during insertion of the cross wire section 60 into the tiering seat 62, the cross wire section is urged by gravity along the sloping cam surface 68 of the tiering bracket 50, which surface 68 preferably slopes continuously downwardly into seat 62, thus positioning the wire section 60 beneath suspension seat 66. It will be understood that since the tiering brackets 50 are generally provided on both ends of each of the sidewall portions 54 of the receptacle or tray, there is a four-point suspension of the underlying tray with respect to the tray disposed immediately above the underlying tray in the suspended condition of the trays.

Referring now to FIGURES 11 through 14, there is shown a tray or receptacle arrangement generally similar to that of FIGURES 8 through 10 except that the tiering brackets 50' are of generally greater depth construction, with the tiering seat 62' being disposed vertically a greater distance away from the suspension seat recess 66' on the overlying ear 64' of the tiering bracket. The sloping cam surface 68' on the bracket 50' is such as to move the associated bottom cross wire section 60 into underlying relationship with respect to the suspension seat 66' when the cross wire is inserted into the bracket. Thus, when the upper tray is lifted to provide a suspended relationship of the trays, the bottom cross wire section 60 of the upper tray move upwardly to engage the respective suspension seat 66' on the lower tray, thus supporting the lower tray on the upper tray. It will be seen that the undercut seat 66' maintains the trays in suspended chainlike condition without danger of disconnection due to the recessed configuration of seat 66' on the ear 64'. A plurality of the trays may be maintained in suspended condition for use in a similar manner as that aforediscussed in connection with the FIGURES 8 to 10 embodiment, and by an arrangement including an overhead trolley 40, rail 38 and rack 42'.

Figure 15:
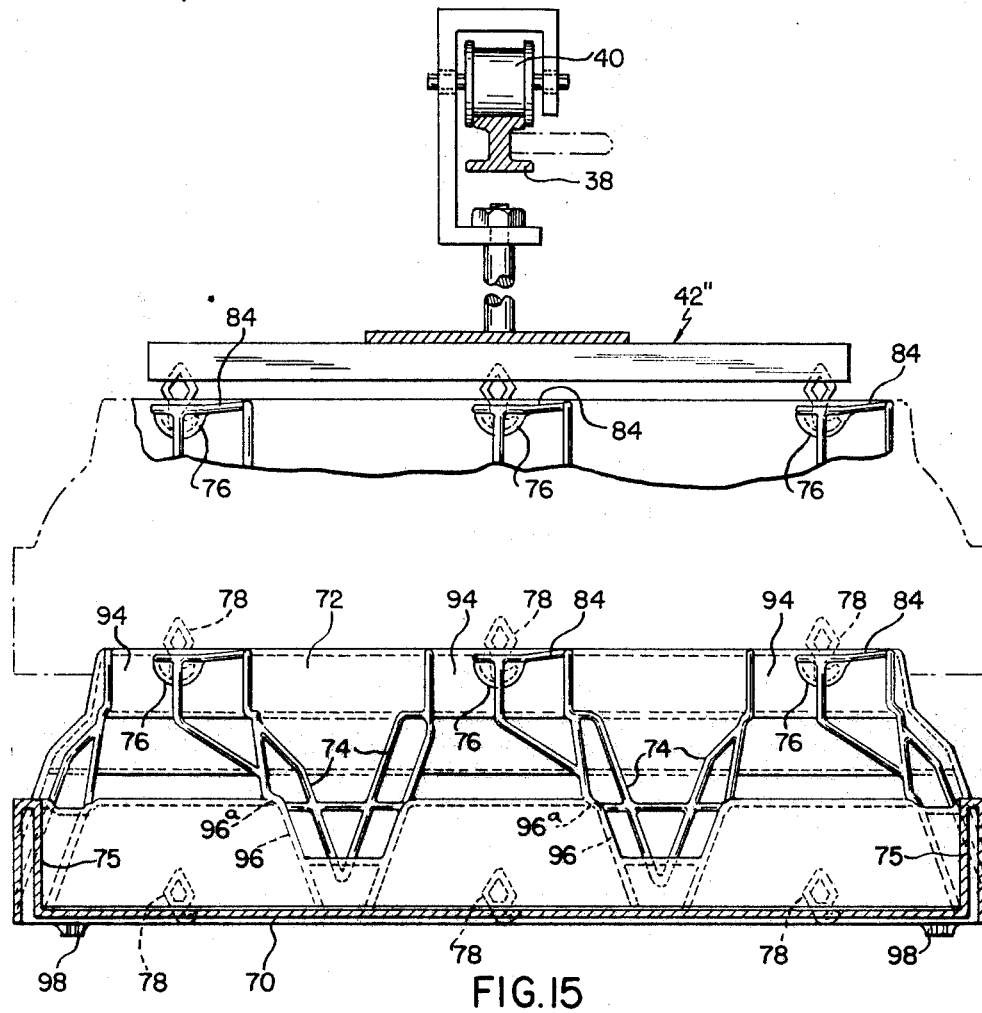
FIGURE 15 is an end elevational view of a further embodiment of a tierable and nestable tray disposed in suspended condition to produce a chainlike arrangement, with tiering supporting means on the trays coacting with one another, resulting in the chainlike arrangement in the suspended condition of the trays.
Figure 16:
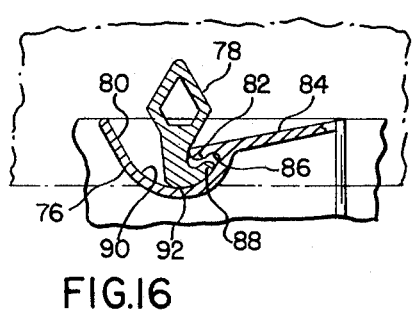
FIGURE 16 is an enlarged fragmentary view illustrating the coaction of the tiering portions of the trays in the stacked condition of the latter.
Figure 17:
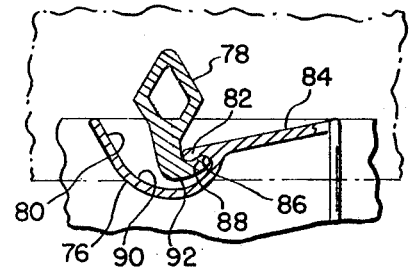
FIGURE 17 is a view similar to FIGURE 16 but illustrating the holding coaction between the tiering portions in a suspended condition of the trays.

Referring now to FIGURES 15 to 17, there is disclosed a stackable and nestable tray or receptacle of the general type illustrated and described in the copending patent application of Joseph A. Rogus, Ser. No, 581,317, filed Sept. 22, 1966, now Patent No. 3,405,810, and entitled "Tierable and Nestable Receptacle." Such receptacle comprises in general a frame including substantially planar bottom portion 70 and opposite upwardly extending sidewall portions 72 of generally thin flat material, with the sidewall portions having reinforcing flange member 74 extending at substantially right angles from the respective sidewall member. End wall portions 75 may be provided for maintaining articles in the receptacles. The flange members 74 are preferably inclined from top to bottom longitudinally of the associated sidewall for the purpose of guiding an upper receptacle downwardly into a lower like receptacle to a nested position, with such flange members in the embodiment illustrated being generally V-shaped, so as to guide the upper receptacle longitudinally into the lower receptacle to a nesting position.

The receptacle includes upper tiering support members 76 on the inside of the associated sidewall and lower tiering support members 78 on the outside of the sidewall thereof, with the sidewall being inclined upwardly and outwardly from the bottom of the receptacle sufficiently to position these upper tiering support members directly vertically above the coacting lower tiering support members. Such tiering support members are adapted for engaged coaction when a plurality of the receptacles are disposed in stacked condition.

Each upper tiering support member 76 defines a generally U-shaped (in elevation) recess 80 opening upwardly and provided with a keeper projection 82 projecting inwardly from one arm of the U-shaped formation. Adjacent this projection is a slide 84 slightly inclined upwardly and away from the projection as shown in FIGURES 16 and 17. Each slide is generally longitudinally aligned with its associated projection and all of the slides of a given receptacle are inclined in one direction or, in other words, towards the same end of the receptacle.

Each keeper 82 defines a suspension seat 86 facing downwardly and adapted for engaged coaction with the complementary formed hook 88 on the lower end of each of the lower tiering support members 78. Each member 78 is adapted to enter into the respective upper tiering support member 76 with the hook portion 88 being disposed beneath the suspension seat 86 when the receptacles are disposed in stacked condition as shown, for instance, in FIGURE 16. The sloping interior wall surface 80 of each tiering support member 76 coacting with the arcuate undersurface configuration 92 of the respective hook, urges the hook to its position beneath the suspension seat 86 on projection 82. When the receptacles are lifted so as to dispose them in columnar suspended condition, the hook portion 88 engages the suspension seat 86 on the overlying projection and suspends the lower receptacle with respect to an upper receptacle. The undercutting of the suspension seat and complementary configuration of the hook portion insures that the hook portion is maintained in engaged relation with the respective projection during the suspension of the receptacles.

When two like receptacles are disposed in vertically aligned tiered relationship as shown in FIGURE 16, the upper receptacles may be shifted laterally sufficiently to clear the hook portions from underlying relation with the keeper projections of tiering support members 76, after which the upper receptacle may be moved vertically sufficiently to clear the tiering support members 76 and until the lower support members 78 are vertically aligned with the clearways 94 in the lower receptacle. The upper receptacle may then be moved downwardly into a nested position in the lower receptacle. During this nesting action the flange members 96 of the upper receptacle coact with the flange members 74 of the lower receptacle in guiding the nesting action, and the shoulders 96a cam tiering support members of the upper receptacle vertically into line over corresponding parts of the lower receptacle. The nesting is adapted to terminate when the end wall portions 75 of the two receptacles come together, and relative endwise movement of the nested receptcles is prevented by engagement of the reinforcing flange members of the receptacles.

If desired shallow feet members 98 may be molded on the underside of the bottom near the four corners of the receptacle.

From the foregoing discussion and accompanying drawings, it will be seen that the invention provides a novel tray or receptacle which is adapted to be disposed in columnar-suspended relation for supporting means on the trays, and with each of the trays including a suspending means which is adapted for supporting relation with respect to the support means on the next lower tray, and wherein when it is desired to nest the trays, they can be collapsed or moved with respect to one another into a more compact column of trays.

While the bottom and side wall portions of the trays or receptacles of for instance FIGURES 1, 6, 8, 11 and 14 have been illustrated as being of a grid-like or open construction, such wall portions might be of at least partially solid or panel-like construction.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A receptacle adapted for being suspended in columnar orientation with at least one other like receptacle, including a frame and means on the frame for supporting a lower receptacle when disposed in said suspended columnar orientation, said frame comprising a bottom portion and an upper edge portion spaced above said bottom portion and side wall portions rigidly connecting said bottom portion and upper edge portion, said supporting means being disposed on said bottom portion, reinforcing the end sections of said upper edge portion of the receptacle, said reinforcing means comprising a generally U-shaped member attached to the corresponding end section of the upper edge portion and extending into secured relation with the sidewall portions of said receptacle.

2. A receptacle adapted for being suspended in columnar orientation with at least one other like receptacle, including a frame and means on the frame for supporting a lower receptacle when disposed in said suspended columnar orientation, said frame comprising a bottom portion and an upper edge portion spaced above said bottom portion and sidewall portions rigidly connecting said bottom portion and upper edge portion, said supporting means being disposed on said bottom portion, said receptacle adapted for nesting coaction with like receptacles upon relative vertical movement between columnar oriented receptacles, means for limiting relative movement between adjacent receptacles during nesting comprising abutments on said sidewall portions projecting laterally therefrom and adapted for engaging relation with the upper edge portion of the next lower receptacle, generally U-shaped means reinforcing the end sections of said upper edge portion, each said U-shaped means comprising legs extending generally diagonally downwardly along the corresponding sidewall portions of said receptacle and terminating in generally horizontally extending sections, the last-mentioned sections providing said abutments for engaging said upper edge portion of the next lower receptacle when the receptacles are in finalized nested condition.

3. A receptacle in accordance with claim 2 wherein said generally horizontally extending sections comprise downwardly projecting protuberances thereon and the upper edge portion includes recesses formed therein in general vertical alignment with the protuberances on said horizontally extending sections, said recesses being adapted to receive the protuberances on an upper receptacle when the receptacles are in nested condition, for restricting relative longitudinal movement between the stacked receptacles.

References Cited

UNITED STATES PATENTS

| | | | |
|---|---|---|---|
| 2,931,535 | 4/1960 | Lockwood | 220—19 X |
| 3,018,002 | 1/1962 | Glezen | 211—126 |
| 3,082,879 | 3/1963 | Wilson | 211—126 |
| 3,091,355 | 5/1963 | Mutto | 220—19 |
| 3,166,348 | 1/1965 | Granger | 220—19 X |
| 3,202,294 | 8/1965 | Rogus | 211—126 |
| 3,407,960 | 10/1968 | Rogus | 211—126 X |

NILE C. BYERS, JR., Primary Examiner

U.S. Cl. X.R.

220—19